United States Patent [19]

Guignard et al.

[11] Patent Number: 5,245,681
[45] Date of Patent: Sep. 14, 1993

[54] RAPIDLY RECONFIGURABLE WAVELENGTH MULTIPLEXING DEVICE

[75] Inventors: Philippe Guignard, Pleumeur-Bodou; Yvon Sorel, Louannec; Jean-François Kerdiles, Pleumeur-Bodou, all of France

[73] Assignee: France Telecom Etablissement Autonome de Droit Public, Paris, France

[21] Appl. No.: 857,435

[22] Filed: Mar. 25, 1992

[30] Foreign Application Priority Data

Mar. 28, 1991 [FR] France ............................... 91 03780

[51] Int. Cl.$^5$ .............................................. G02B 6/26
[52] U.S. Cl. ............................................ 385/16; 385/17; 385/18
[58] Field of Search ....................... 385/16, 17, 18; 359/127, 128, 133

[56] References Cited

U.S. PATENT DOCUMENTS

| 4,232,385 | 11/1980 | Hara et al. ........................ 359/127 |
| 4,341,438 | 7/1982 | Seki et al. ..................... 359/127 X |
| 4,359,773 | 11/1982 | Swartz et al. . |
| 4,696,059 | 9/1987 | MacDonald et al. ............ 385/17 X |
| 4,783,850 | 11/1988 | MacDonald et al. .............. 359/128 |
| 4,815,803 | 3/1989 | Faulkner et al. ................ 385/17 X |
| 5,063,559 | 11/1991 | Marcuse ............................. 359/127 |

OTHER PUBLICATIONS

Coherent Optical Communications and Photonic Switching, Sep. 19-23, 1989, pp. 237-248, David W. Smith, "Combined Spectral & Spatial Multiplexing Schemes for Switching Networks".

IEEE Journal of Quantum Electronics, vol. QE-22, No. 6, Jun. 6, 1986, pp. 911-919, Richard R. Forber, et al., "Symmetric Directional Coupler Switches".

Patent Abstracts of Japan, & JP-A-60-185438, Sep. 20, 1985, F. Ogawa, et al., "Semiconductor Laser Switching Device".

Primary Examiner—John D. Lee
Assistant Examiner—Phan T. Heartney
Attorney, Agent, or Firm—Oblon, Spivak, McClelland, Maier & Neustadt

[57] ABSTRACT

A wavelength multiplexing device comprising a switching matrix (18) of the N to 1 type, which has several successive stages (18a,18b) of controllable optical couplers (20) interconnected to form a tree structure and modulating means (24) connected to the output of the switching matrix (18). The device further has N sources (10,12,14,16) each emitting a continuous light beam having a particular wavelength to an input of the matrix, and a control circuit (22) connected to the couplers and controlling the latter so as to select P wavelengths from among the N available wavelengths. The device allows efficient transmission of data through an optical network.

6 Claims, 1 Drawing Sheet

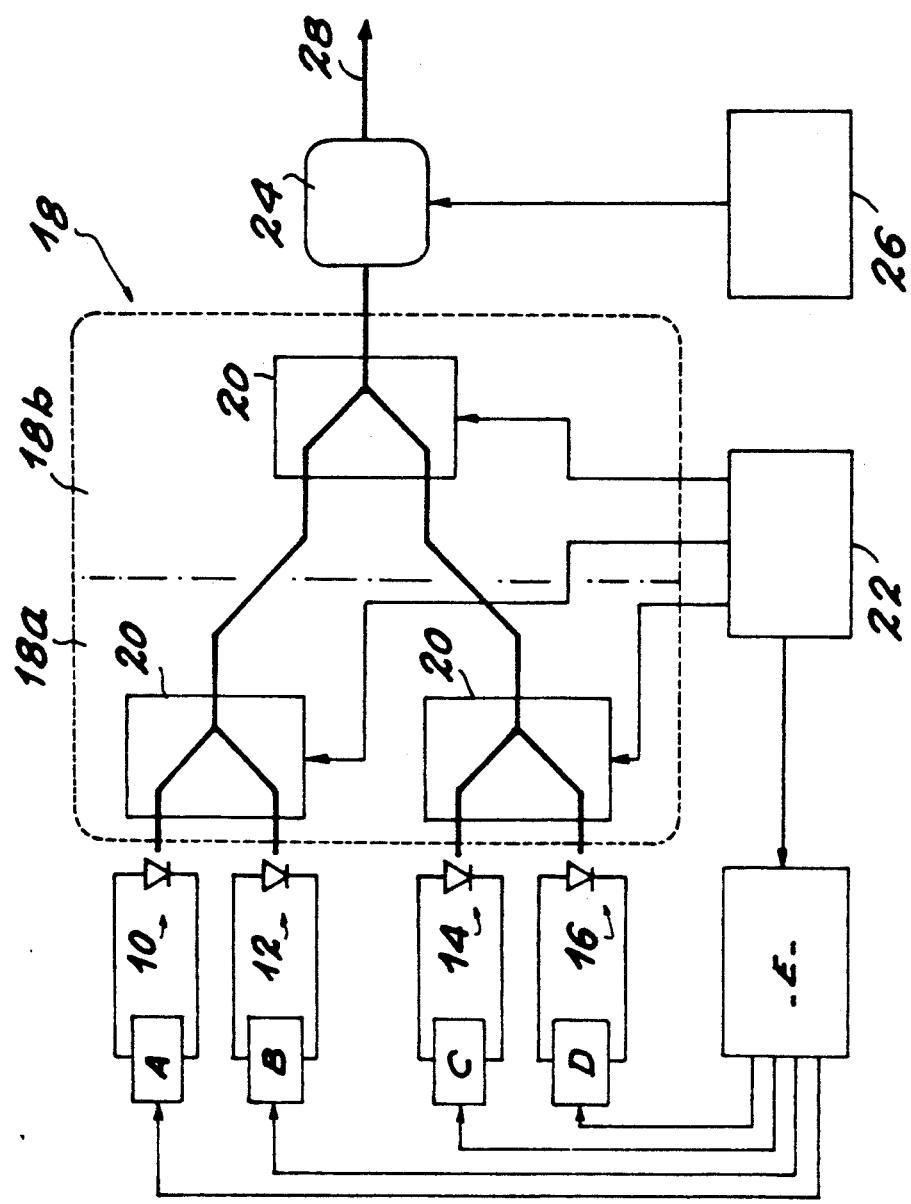

RAPIDLY RECONFIGURABLE WAVELENGTH MULTIPLEXING DEVICE

BACKGROUND OF THE INVENTION

1. Field of the Invention

The present invention relates to a rapidly reconfigurable wavelength multiplexing device. It more particularly applies to the transmission of data in an optical network, with optical switching in which a wavelength is associated with data in order to then switch them to the optical memories by filtering (using a switching device, e.g. of the Asynchronous Transfer Mode or ATM type). It is then possible to store data at different wavelengths on the same physical support.

The present device makes it possible to allocate a particular wavelength to the data to be stored.

2. Description of the Related Art

In optical networks, optical multiplexing makes it possible to increase the transmission capacity of a fibre optic link by superimposing on the same optical fibre several channels, each using a particular wavelength.

It is known that optical multiplexing volume devices such as a fibre coupler, a network multiplexer or an interference filter multiplexer are fixed once and for all in their initial configuration or are only reconfigurable very slowly compared with the information transmission needs. In other words, the distribution of different wavelengths can only be modified with difficulty or slowly.

In certain known networks, laser diodes are modulated so as to emit a modulated light signal. In this case, the sending of the same information on all or part of the channels is problematical. It is either necessary to reserve a common channel to all the receivers, which involve greater equipment complexity, or all the beams of different wavelength have to be identically modulated, which implies the same message being repeated the same number of times as there are wavelengths.

SUMMARY OF THE INVENTION

The present invention relates to a device permitting the transmission of information on one or more channels of a fibre optic connection and which has a high switching speed between individual wavelengths in order to permit a communication in the "packet" mode. In this communication mode, the information to be transmitted is subdivided into packets having a predetermined duration and are sequentially emitted on the network at a wavelength dependent on the addressee of the packet.

The device according to the invention also permits a total or selective transmission of information, i.e. the simultaneous sending of the same message on all the channels or to any randomly selected group of channels.

More specifically, the present invention relates to a wavelength multiplexing device comprising a switching matrix having N inputs and one output, N being an integer equal to or greater than 2, said matrix having several successive stages of controllable optical couplers interconnected in a tree structure, modulating means connected to the output of the switching matrix, N light sources each able to emit a continuous light beam having a particular wavelength to an input of the switching matrix and a control circuit connected to the couplers and provided for controlling the latter so as to select P wavelengths from among N available wavelengths, with $1 \leq P \leq N$.

The control circuit of the couplers makes it possible to select the configuration chosen by the user, and can be constituted by an adequately programmed processor or advantageously by a logic control circuit.

In a particular embodiment, the device also comprises a data processing circuit connected to the modulating means and able to supply a modulation control signal. The light sources can be laser sources. The device can also comprise a control member able to modify the lighting power of each light source. Preferably, said member is controlled by the control circuit so as to ensure an identical lighting power for each selected wavelength at the output of the device.

BRIEF DESCRIPTION OF THE DRAWINGS

The characteristics and advantages of the invention can be better gathered from the following description given in an illustrative and in no way limitative wherein: the single drawing diagrammatically shows a multiplexing device according to the invention.

DESCRIPTION OF THE PREFERRED EMBODIMENTS

With reference to the single drawing, a description will now be given of a multiplexing device according to the invention. In the represented embodiment, each of the four laser diodes 10,12,14,16 supplies a continuous light beam having a particular wavelength to an input of a switching matrix 18. It is pointed out that the number N of available wavelengths is only limited to four here for reasons of clarity of the description. These wavelengths all differ from one another.

The switching matrix 18 is of the N to 1 type, i.e. it has N inputs (N being equal to 4 in the represented embodiment) and one output. The matrix 18 has several successive stages 18a, 18b of optical couplers 20 controllable by the application of control voltages. In the represented embodiment, each coupler 20 has two inputs and one output. They can e.g. be couplers of the $LiNbO_3$ intensity modulator type marketed by Thomson Sintra under the reference MOH 902. Such couplers 20 have very short switching times of approximately 100 picoseconds. The couplers 20 of successive stages are interconnected to form a tree structure.

In the represented embodiment, bearing in mind that there are four laser diodes, the switching matrix only has two stages 18a, 18b. It is clear that the switching matrix has the number of stages necessary to have N inputs and one output. The first stage 18a has a sufficient number of couplers 20 to establish an input connection with each laser diode. In the represented embodiment, the stage 18a has two couplers 20, i.e. four inputs and two outputs. The following stage 18b only has one coupler 20 connected by two inputs to the two outputs of the preceding stage 18 and only has one output.

A control circuit 22 supplying control voltages is connected to each of the couplers 20 of the switching matrix. This control circuit is e.g. an electronic, cabled logic circuit having the advantage of very rapidly reacting in a time of approximately 100 to 200 ps (using GaAs-based technology).

As a function of the control voltage applied to it, a coupler 20 supplies on its output either a light beam from one of its inputs, or a light beam from the other of its inputs, or a mixture of these light beams.

As a function of the number of selected wavelengths, a control member E makes it possible to ensure a constant lighting power for the different channels (or wavelengths) at the output of the device.

In the represented embodiment, the member E controls the current generators A,B,C,D respectively supplying the laser diodes 10,12,14, 16, so as to obtain this constant lighting power for the different wavelengths at the output of the device.

The member E is controlled by the circuit 22 as a function of the wavelength configuration selected by said circuit 22.

Modulating means 24 are connected by an input to the output of the switching matrix 18. It is e.g. possible to use a LiNbO$_3$ phase or intensity modulator.

A data processing circuit 26 is connected to the modulating means 24 and supplies a modulation control signal as a function of the information to be transmitted. The modulating means 24 are connected at the output to a connecting optical fibre 28.

The switching matrix 18 makes it possible to select at random all or part of the carriers supplied by the laser diodes. The information to be transported is delivered by external modulation on all the carriers selected at once. The high switching speed permits a reconfiguration of the multiplexed carriers and authorizes a communication "by packets" in the optical network.

The address or addresses of the receiver or receivers are transmitted to the logic control circuit 22, which selects adequate carriers. The data processing circuit orders in series the informations corresponding to the successive packets and applies adequate control signals to the modulating means after a time lag making it possible to ensure the establishment of the optical path between the selected laser diode or diodes and the modulating means. The switching matrix 18 and optionally the modulating means 24 can be integrated on the same substrate.

Obviously, when there is a large number of channels, the lighting power losses caused by the switching matrix can be compensated by appropriately positioned optical amplification means.

We claim:
1. A wavelength multiplexing device, comprising:
    a switching matrix having N inputs and one output, N being an integer equal to or greater than 2, said matrix having a plurality of successive stages of controllable optical couplers interconnected in a tree structure;
    modulating means connected to the output of the switching matrix;
    N light sources, each for emitting a continuous light beam having a particular wavelength to a corresponding one of said inputs of the switching matrix; and
    a control circuit, connected to the couplers, for controlling the latter so as to select P wavelengths from among N available wavelengths, with $1 \leq P \leq N$.
2. A device according to claim 1, characterized in that the control circuit is a cabled logic circuit.
3. A device according to claim 1, further comprising:
    a data processing circuit, connected to the modulating means, for supplying a modulation control signal to the modulating means.
4. A device according to claim 1, characterized in that the sources are laser sources.
5. A device according to claim 1, further comprising:
    a control member for modifying a lighting power of each light source.
6. A device according to claim 5, wherein the control member is controlled by the control circuit so that an identical lighting power for each selected wavelength is output at the output of the device.

* * * * *